(12) United States Patent
Wang et al.

(10) Patent No.: US 7,864,385 B2
(45) Date of Patent: Jan. 4, 2011

(54) PLANAR LIGHT SOURCE OF SCANNING APPARATUS

(76) Inventors: Chung-Kai Wang, 669, Ruey Kuang Road, Neihu 114, Taipei (TW) 114; Chien-Kuo Kuan, 669, Ruey Kuang Road, Neihu 114, Taipei (TW) 114

( * ) Notice: Subject to any disclaimer, the term of this patent is extended or adjusted under 35 U.S.C. 154(b) by 1603 days.

(21) Appl. No.: 11/117,265

(22) Filed: Apr. 28, 2005

(65) Prior Publication Data
US 2005/0259436 A1 Nov. 24, 2005

(30) Foreign Application Priority Data
May 24, 2004 (TW) ............................... 93114628 A

(51) Int. Cl.
*H04N 1/04* (2006.01)
(52) U.S. Cl. ...................... 358/484; 362/602
(58) Field of Classification Search ................ 358/484, 358/487, 475, 506, 509; 250/227.11, 227.14, 250/234, 235; 355/67–69
See application file for complete search history.

(56) References Cited

U.S. PATENT DOCUMENTS

| 6,989,918 B2 * | 1/2006 | Haas et al. ................... 358/487 |
| 2008/0112159 A1 * | 5/2008 | Maglica ....................... 362/158 |

FOREIGN PATENT DOCUMENTS

| JP | 258229 | 4/1990 |
| JP | 02-273971 | 11/1990 |
| JP | 06-252497 | 9/1994 |
| JP | 533130 | 9/1999 |
| JP | 11312402 | 11/1999 |
| JP | 2001-136735 | 5/2001 |
| JP | 2005-145745 | 6/2009 |
| TW | 510117 | 11/2002 |
| TW | 525791 | 3/2003 |
| TW | 558015 | 10/2003 |

OTHER PUBLICATIONS 2005145745, mail date Aug. 29, 2008, JPO Office Action.

* cited by examiner

*Primary Examiner*—King Y Poon
*Assistant Examiner*—Iriana Cruz
(74) *Attorney, Agent, or Firm*—Workman Nydegger

(57) ABSTRACT

A planar light source for use in a scanning apparatus includes a light-emitting element, a first light-guiding portion and a second light-guiding portion. The light-emitting element is arranged at a side of the scanning platform opposite to the carriage module for providing a source light. The first light-guiding portion is disposed at a first side of the light-emitting element for diffusing the source light as a first planar light to be provided for a carriage module through a scanning platform of the scanning apparatus. The second light-guiding portion is disposed at a second side of the light-emitting element opposite to the first side for diffusing the source light as a second planar light to be provided for the carriage module through the scanning platform.

14 Claims, 6 Drawing Sheets

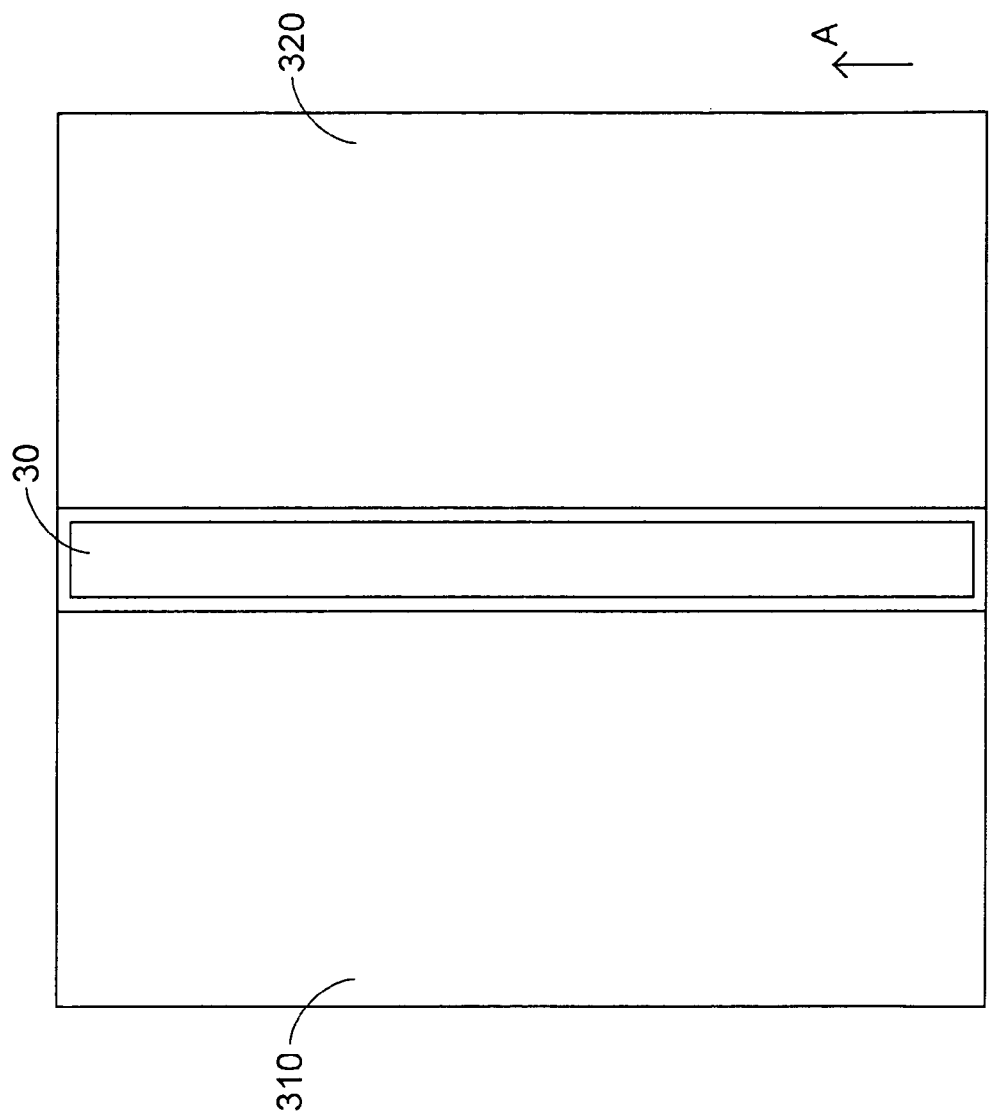

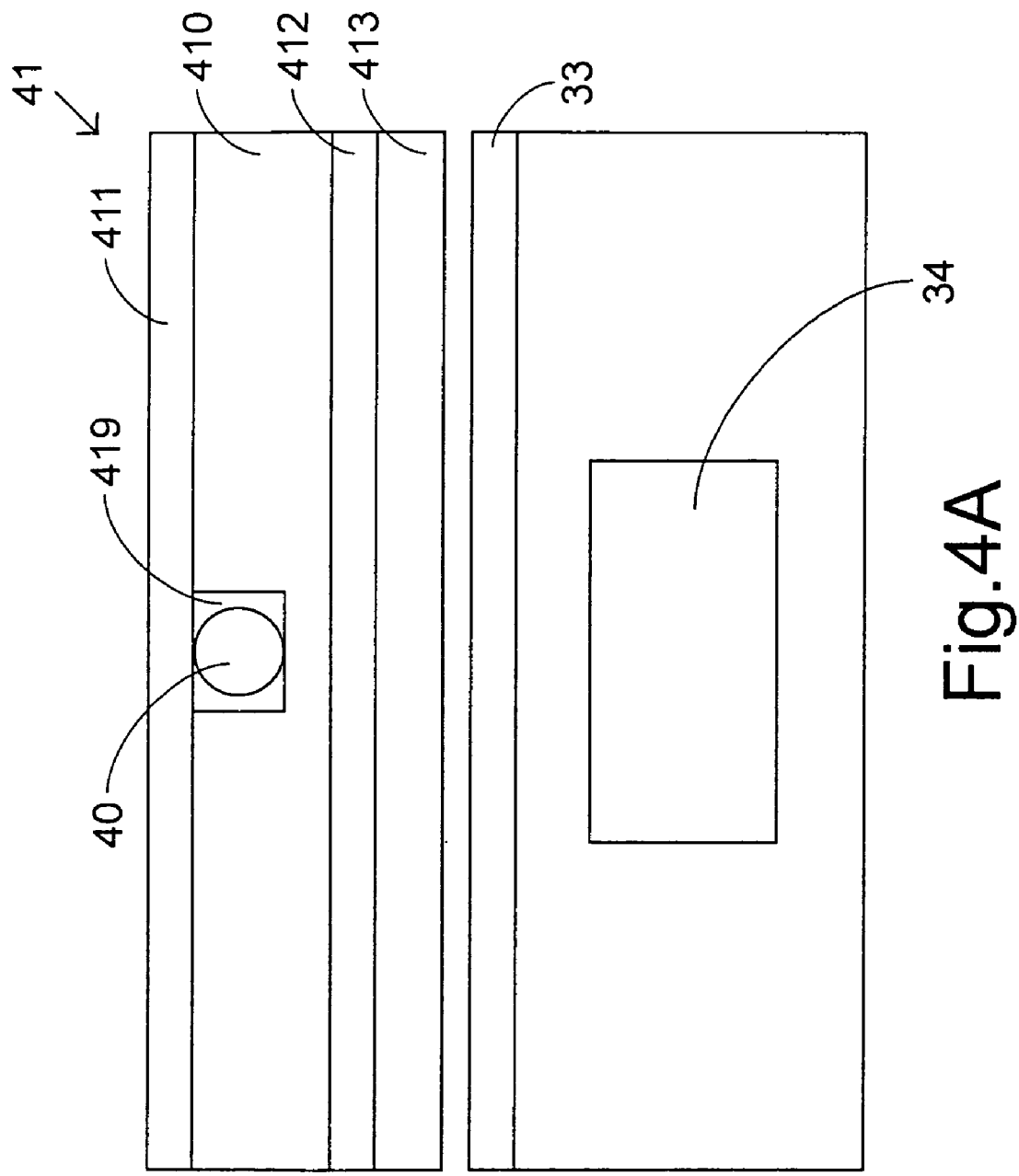

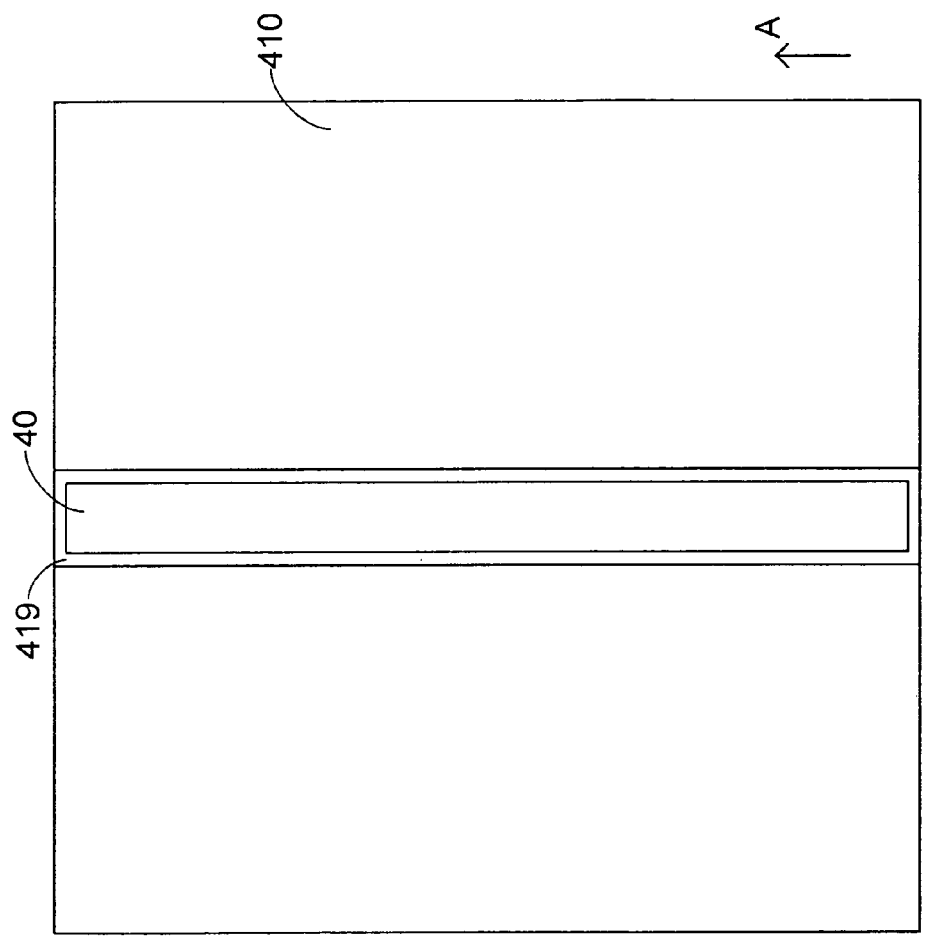

PLANAR LIGHT SOURCE OF SCANNING APPARATUS

FIELD OF THE INVENTION

The present invention relates to a planar light source, and more particular to a planar light source for use in a scanning apparatus.

BACKGROUND OF THE INVENTION

Scanners are widely used to process image of objects into digital forms. Depending on the property of the scanned object, different types of scanners are used. Generally, a transmissive scanner is used for scanning transparent objects, and a reflective scanner is used for scanning opaque objects. Examples of opaque objects include paper sheets, photographs, etc., and common transparent objects are for example slides and films. For scanning both opaque and transparent objects with the same scanner, a dual-mode scanner for optional transmissive/reflective scanning was developed.

Please refer to FIG. 1, which is a schematic diagram viewing from a side of a conventional dual-mode image scanner. In the image scanner, both reflective light source 12 and penetrative light source 13 are provided in the lower housing 101 and the upper housing 102, respectively, and selectively turned on for different scanning purposes. For reflective-type scanning operation, it is the reflective light source 12 disposed in the carriage 11 turned on while the penetrative light source 13 is turned off. The light emitted by the light source 12 is reflected by the scanned object 14, which is clamped between the upper housing 102 and the lower housing 101. The reflective image then enters the carriage 11, guided by a mirror set 15, focused by a lens set 16 and processed by an image pickup device such as a charge coupled device (CCD) 17 to complete scanning. On the other hand, for penetrative-type scanning operation, it is the penetrative light source 13 disposed opposite to the carriage 11 turned on while the reflective light source 12 is turned off. The light emitted by the light source 13 penetrates through the scanned object 14 and then enters the carriage 11. The image is also processed by the elements 15, 16 and 17 in the carriage 11 to generate electric signals in response to the image of the scanned object 14.

Nowadays, the penetrative light source 13 is implemented with a planar light source so that the light source 13 does not have to move with the carriage 11 to scan lines. The planar light source 13 generally includes a light-emitting element 21 for emitting light and a light-guiding plate 20 for diffusing light all over the plate, as shown in FIG. 2A, which is advantageous for small thickness and high conformity to the upper housing. The light-emitting element 21 can be, for example, a linear cold cathode lamp. Since the light-emitting element 21 is disposed at one side of the light-guiding plate 20 that afterwards diffuses light to the opposite side, the light intensity at both ends of each scan line may differ a lot. Consequently, the resulting image quality would be unsatisfactory. For solving this problem, double lamps 22 and 23 are disposed at both sides of the light-guiding plate 20 to unify the light intensity provided for the scanned object. Since two lamps are used, it is apparent that cost and power consumption increase.

SUMMARY OF THE INVENTION

Therefore, the present invention provides a planar light source that can uses only one lamp to achieve the purpose of even illumination.

In accordance with a first aspect of the present invention, there is provided a planar light source for use in a scanning apparatus. The scanning apparatus comprises a scanning platform for placing thereon an object to be scanned and a carriage module for processing image of the object into digital signals. The planar light source comprises a light-emitting element, a first light-guiding portion and a second light-guiding portion. The light-emitting element is arranged at a side of the scanning platform opposite to the carriage module for providing a source light. The first light-guiding portion is disposed at a first side of the light-emitting element for diffusing the source light as a first planar light to be provided for the carriage module through the scanning platform. The second light-guiding portion is disposed at a second side of the light-emitting element opposite to the first side for diffusing the source light as a second planar light to be provided for the carriage module through the scanning platform.

Preferably, the light-emitting element is the only light-emitting element in the planar light source.

Preferably, the source light is a linear light.

Preferably, the light-emitting element is a cold cathode ray lamp.

In an embodiment, each of the first and second light-guiding portions comprises a light-guiding plate, a light-reflecting film, a light-polarizing plate and a light-diffusing film. The light-guiding plate is disposed next to the light-emitting element for guiding the source light into the light guiding portion. The light-reflecting film is arranged at a first side of the light-guiding plate for reflecting light toward a second side of the light-guiding plate. The light-polarizing plate is disposed at the second side of the light-guiding plate for processing light into polarized light. The light-diffusing film is used for unifying intensity of the polarized light so as to provide the first or second planar light.

In an embodiment, the light-reflecting films of the first and second light-guiding portions are integrated as a single film.

In an embodiment, the light-polarizing plates of the first and second light-guiding portions are integrated as a single plate.

In an embodiment, the light-diffusing films of the first and second light-guiding portions are integrated as a single film.

In an embodiment, the light-guiding plates of the first and second light-guiding portions are disposed at opposite sides of the light-emitting element.

In an embodiment, the light-guiding plates of the first and second light-guiding portions are integrated as a single plate. Preferably, the light-emitting element is disposed in a middle receptacle of the single plate.

In an embodiment, the light-emitting element, the first light-guiding portion and the second light-guiding portion are positioned in an upper cover of the scanning apparatus.

In accordance with a second aspect of the present invention, there is provided a scanning apparatus for scanning a light-transmissive object. The scanning apparatus comprises a scanning platform, a carriage module arranged and a light-guiding member. The scanning platform is used for placing thereon an object to be scanned. The carriage module is arranged under the scanning platform for processing image of the object into digital signals. The linear light-emitting element is arranged over the scanning platform for emitting a source light. The light-guiding member encloses the linear light-emitting element in a center position thereof for diffusing the source light all over a lower surface thereof as a planar light for transmissive scanning.

Preferably, the linear light-emitting element is a cold cathode ray lamp.

In an embodiment, the linear light-emitting element extends in a direction parallel to the moving direction of the carriage module in the scanning apparatus.

In an embodiment, the light-guiding member comprises first and second light-guiding plates, a light-reflecting film, a light-polarizing plate and a light-diffusing film. The first and second light-guiding plates are arranged at opposite sides of the linear light-emitting element for guiding the source light into the light-guiding member. The light-reflecting film overlies the linear light-emitting element and the first and second light-guiding plates for reflecting light downwards. The light-polarizing plate underlies the linear light-emitting element and the first and second light-guiding plates for processing light into a polarized light. The light-diffusing film underlies the light-polarizing plate for unifying intensity of the polarized light so as to provide the planar light.

In an embodiment, the light-guiding member comprises a light-reflecting film, a light-guiding plate, a light-polarizing plate and a light-diffusing film. The light-reflecting film overlies the linear light-emitting element and the first and second light-guiding plates for reflecting light downwards. The light-guiding plate has a middle receptacle for accommodating the linear light-emitting element and guiding the source light into the light-guiding member. The light-polarizing plate underlies the light-guiding plate for polarizing light from the light-guiding plate. The light-diffusing film underlies the light-polarizing plate for diffusing light from the light-polarizing plate as the planar light.

In an embodiment, the linear light-emitting element and the light-guiding member are positioned in an upper cover of the scanning apparatus.

The present invention will become more readily apparent to those ordinarily skilled in the art after reviewing the following detailed description and accompanying drawings, in which:

BRIEF DESCRIPTION OF THE DRAWINGS

FIG. 3B is a schematic top view of the planar light source of FIG. 3A, which is disposed between light-guiding plates;

FIG. 4A is a schematic diagram showing a scanning apparatus according to another embodiment of the present invention; and FIG. 4B is a schematic top view of the planar light source of FIG. 4A, which is inserted in a light-guiding plate.

DETAILED DESCRIPTION OF THE PREFERRED EMBODIMENT

Figure 1:
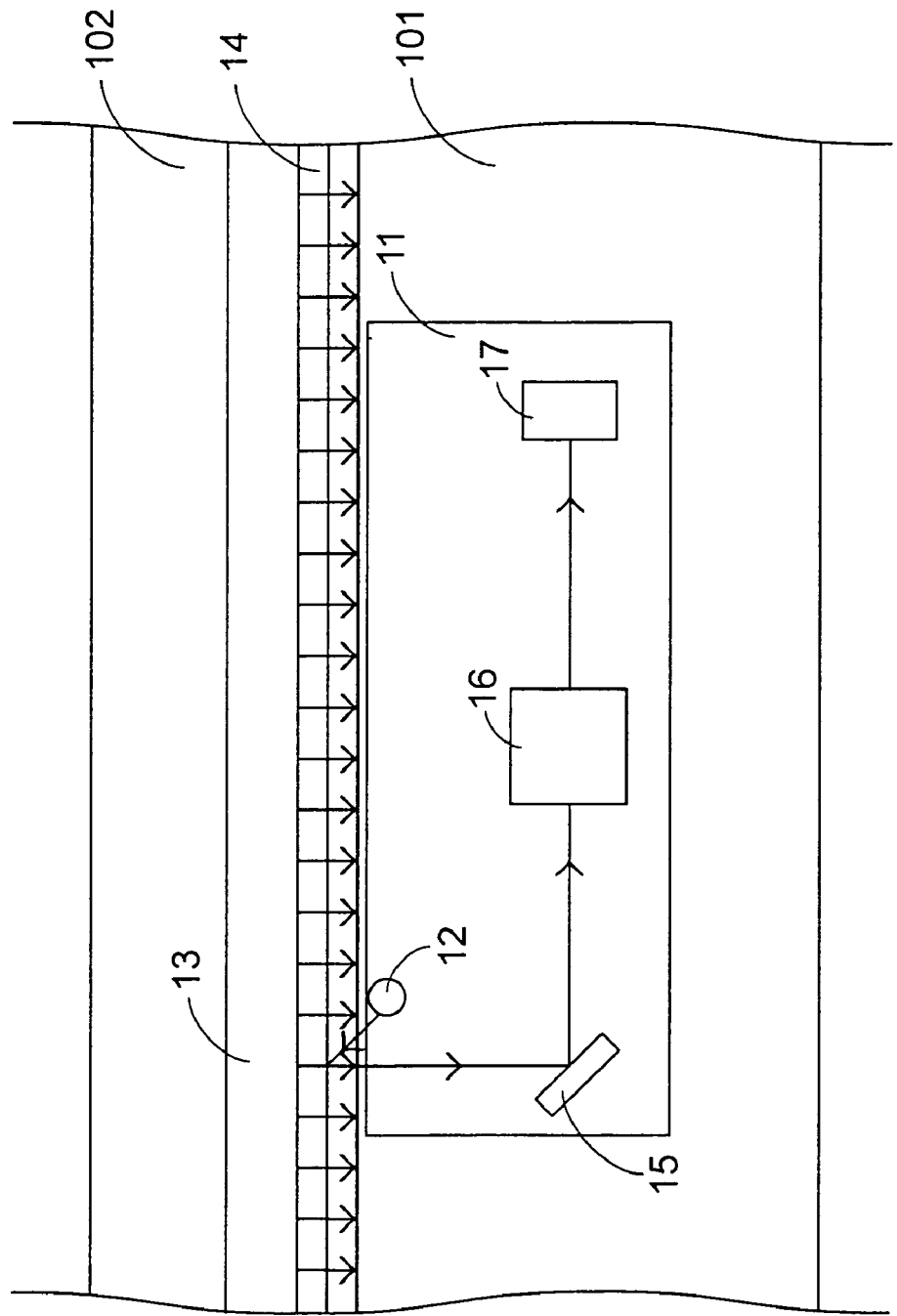
FIG. 1 is a schematic diagram showing a conventional dual-mode scanner.
Figure 2A:
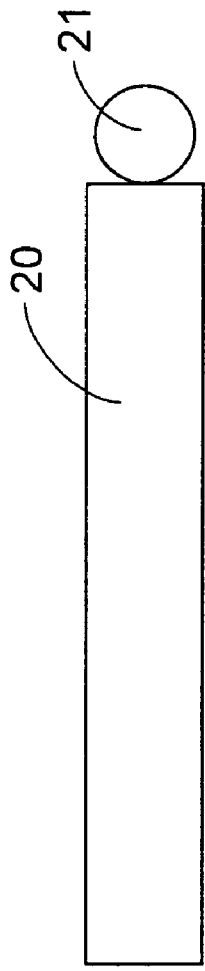
FIG. 2A is a schematic diagram showing a conventional planar light source with a single lamp and a light-guiding plateused for transmissive scanning.
Figure 2B:
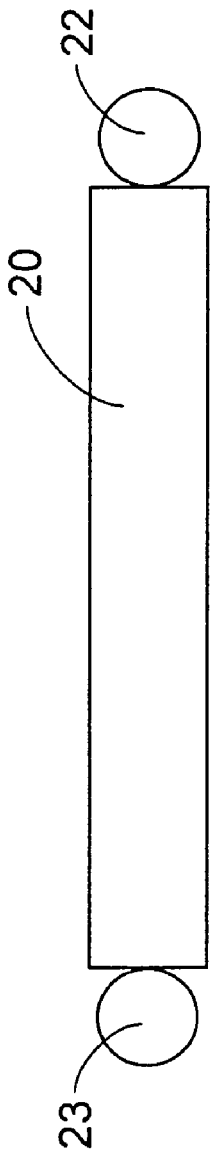
FIG. 2B is a schematic diagram showing another conventional planar light source with double lamps and a light-guiding plate used for transmissive scanning.
Figure 3A:
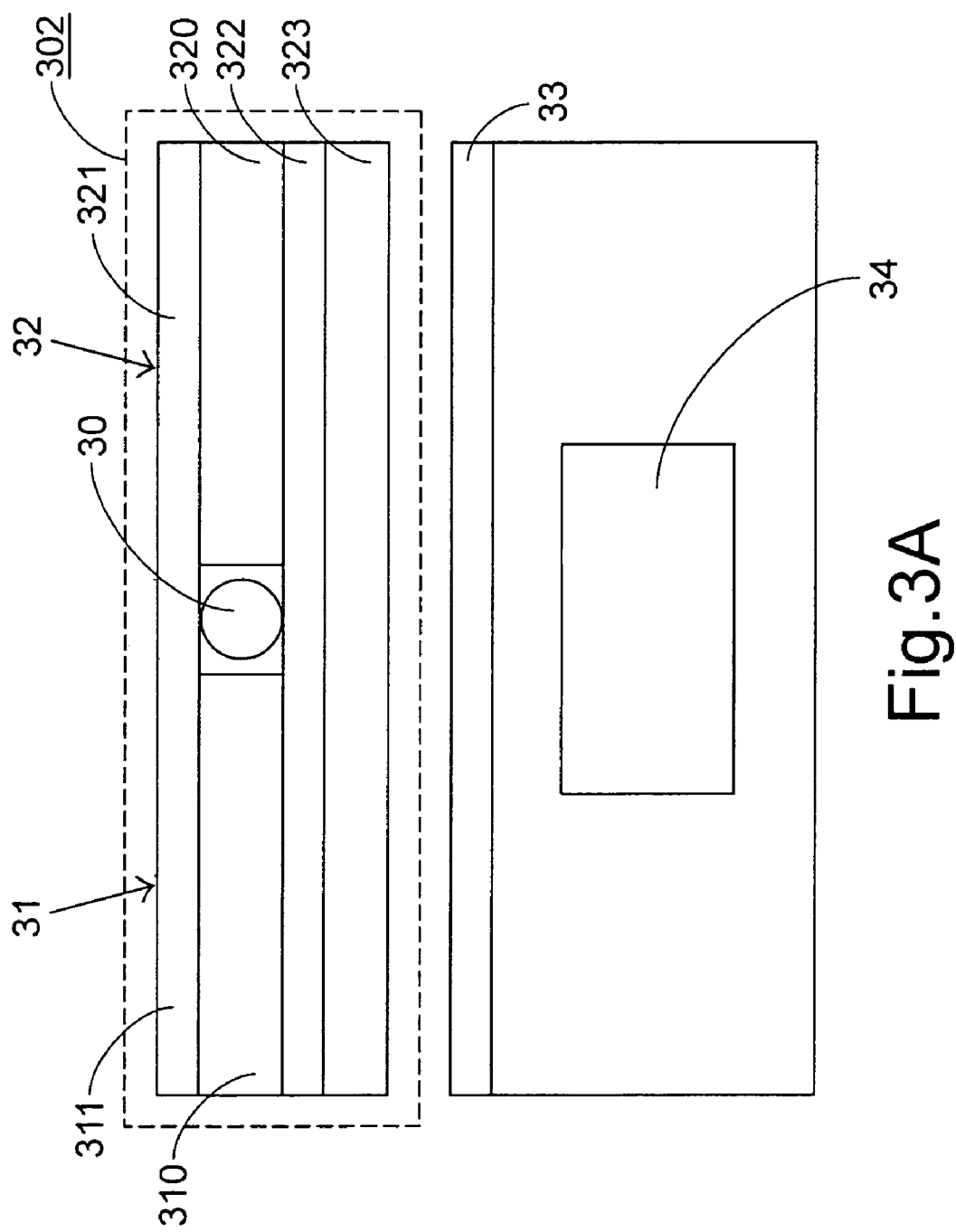
FIG. 3A is a schematic diagram showing a scanning apparatus according to an embodiment of the present invention.

Referring to FIGS. 3A and 3B, a planar light source for use in a transmissive scanner or a reflective/transmissive dual-mode scanner according to an embodiment of the present invention is schematically shown from a side view. The planar light source is positioned in an upper cover 302 of the scanner above a scanning platform 33. A carriage module 34 is disposed in the lower housing of the scanner under the scanning platform 33. The carriage module 34 is accommodated therein optical elements including a mirror set, a lens set and a photoelectric conversion device such as a charge coupled device (CCD) for processing image of a scanned object into digital signals. The operation principles of these optical elements can be the ones conventionally used, so they are not to be redundantly described herein. The planar light source comprises a light-emitting element 30 for emitting light as source light and a light-guiding structure consisting of a first light-guiding portion 31. and a second light-guiding portion 32 disposed at opposite sides of the light-emitting element 30, respectively, for diffusing the light emitted by the light-emitting element 30 as planar light. The light-emitting element 30, for example a cold cathode ray lamp, extends in a direction parallel to the moving direction of a carriage 34, as indicated by the arrow A. In this way, the light intensity difference among scan lines can be minimized.

In this embodiment, each of the light-guiding portions 31 and 32 includes a light-emitting film, a light-guiding plate, a light-polarizing plate and a light-diffusing film. The light-emitting element 30 is disposed between respective light-guiding plates 310 and 320 of the light-guiding portions 31 and 32. The light-guiding plate 310 arranged next to one side of the light-emitting element 30 guides the source light emitted from the light-emitting element 30 thereinto. On the other hand, the light-guiding plate 320 arranged next to the opposite side of the light-emitting element 30 guides the source light emitted from the light-emitting element 30 thereinto. The light-reflecting film 321 of the light-guiding portions 31 and 32 are a common single film overlying the light-emitting element 30 and the light-guiding plates 310 and 320 for reflecting light emitted by the light-emitting element 30 or the light scattered by the light-guiding plates 310 and 320 back to the light-guiding plates 310 and 320. The light passing through the light-guiding plates 310 and 320 then reaches the common single light-polarizing plate 322 which underlies the light-emitting element 30 and the light-guiding plates 310 and 320 to be polarized, and then processed by the common single light-diffusing film 323 underlying the light-polarizing plate 322. Through the light-diffusing film 323, the light intensity all over the light-guiding structure is unified so as to provide appropriate planar light for the scanned object (not shown) placed on the scanning platform 33.

A further embodiment of a planar light source is illustrated in FIGS. 4A and 4B. The planar light source comprises a light-emitting element 40 and a light-guiding portion 41. In this embodiment, the light-emitting element 40 is a cold cathode ray lamp extending in a direction parallel to the moving direction of the carriage 34, as indicated by the arrow A. The light-guiding portion 41 comprises a light-guiding plate 410, a light-reflecting film 411, a light-polarizing plate 412 and a light-diffusing film 413. The light-guiding plate 410 has a middle receptacle 419 for accommodating the light-emitting element 40. The light-reflecting film 411 overlies the light-emitting element 40 and the light-guiding plate 410. The light-guiding plate 410 guides the light emitted from the light-emitting element 40 thereinto and the light-reflecting film 411 reflects the light emitted from the light-emitting element 40 and the light scattered by the light-guiding plate 410 downwards. The light-polarizing plate 412 underlies the light-emitting element 40 and the light-guiding plate 410, and the light-diffusing film 413 underlies the light-polarizing plate 412. The downward light is polarized by the light-polarizing plate 412, and the intensity thereof is further unified by the light-diffusing film 413 to provide appropriate planar light penetrating through the scanned object (not shown) placed on the scanning platform 33.

From the above descriptions, since the light-emitting element 30 is enclosed in the middle of the light-guiding structure by being disposed between the light-guiding plates 310 and 320 or inserted into the receptacle 419 of the light-guiding plate 410, the light emitted by a linear light source can be diffused outwards so as to transform into planar light. Further, due to the presence of the reflecting film, polarizing plate and diffusing film, the planar light source of the present invention is capable of providing planar light of satisfactory quality and intensity for scanning. In addition, since a single cold cathode ray lamp is enough for the present application, it is advantageous of reducing cost and power consumption.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A planar light source for use in a scanning apparatus, said scanning apparatus comprising a scanning platform for placing thereon an object to be scanned and a carriage module for processing an image of said object into digital signals, said planar light source comprising:
    a light-emitting element arranged at a side of said scanning platform opposite to said carriage module for providing a source light;
    a first light-guiding portion disposed at a first side of said light-emitting element for diffusing said source light as a first planar light to be provided for said carriage module through said scanning platform, the first light-guiding portion comprising a first light-guiding plate configured to guide a first portion of the source light; and
    a second light-guiding portion disposed at a second side of said light-emitting element opposite to said first side for diffusing said source light as a second planar light to be provided for said carriage module through said scanning platform, the second light-guiding portion comprising a second light-guiding plate configured to guide a second portion of the source light;
    wherein the light-emitting element is positioned between opposing edges of the first and second light-guiding plates.

2. The planar light source according to claim 1 wherein said light-emitting element is the only light-emitting element in said planar light source.

3. The planar light source according to claim 1 wherein said source light is a linear light.

4. The planar light source according to claim 1 wherein said light-emitting element is a cold cathode ray lamp.

5. The planar light source according to claim 1 wherein each of said first and second light-guiding portions comprises:
    a light-reflecting film arranged at a first side of said first and second light-guiding plates for reflecting light toward a second side of said first and second light-guiding plates;
    a light-polarizing plate disposed at said second side of said first and second light-guiding plates for processing light into polarized light; and
    a light-diffusing film for unifying intensity of said polarized light so as to provide said first or second planar light.

6. The planar light source according to claim 5 wherein said light-reflecting films of said first and second light-guiding portions are integrated as a single film.

7. The planar light source according to claim 5 wherein said light-polarizing plates of said first and second light-guiding portions are integrated as a single plate.

8. The planar light source according to claim 5 wherein said light-diffusing films of said first and second light-guiding portions are integrated as a single film.

9. The planar light source according to claim 1 wherein said light-emitting element, said first light-guiding portion and said second light-guiding portion are positioned in an upper cover of said scanning apparatus.

10. A scanning apparatus for scanning a light-transmissive object, comprising:
    a scanning platform for placing thereon an object to be scanned;
    a carriage module arranged under said scanning platform for processing image of said object into digital signals;
    a linear light-emitting element arranged over said scanning platform at a side of said scanning platform opposite to said carriage module for emitting a source light; and
    a light-guiding member enclosing said linear light-emitting element in a center position thereof, the light-guiding member including a light-guiding plate defining a receptacle, a first light-guiding portion disposed at a first side of said receptacle, and a second light-guiding portion disposed at a second side of said receptacle, said second side being opposite to said first side, the linear light-emitting element being positioned within the receptacle, the light-guiding plate being configured to guide said source light within the light-guiding member so as to diffuse said source light all over a lower surface thereof as a planar light for transmissive scanning.

11. The scanning apparatus according to claim 10 wherein said linear light-emitting element is a cold cathode ray lamp.

12. The scanning apparatus according to claim 10 wherein said linear light-emitting element extends in a direction parallel to the moving direction of said carriage module in said scanning apparatus.

13. The scanning apparatus according to claim 10 wherein said light-guiding member comprises:
    a light-reflecting film overlying said linear light-emitting element and said light-guiding plate for reflecting light downwards;
    a light-polarizing plate underlying said linear light-emitting element and said light-guiding plate for processing light into a polarized light; and
    a light-diffusing film underlying said light-polarizing plate for unifying intensity of said polarized light so as to provide planar light.

14. The scanning apparatus according to claim 10 wherein said linear light-emitting element and said light-guiding member are positioned in an upper cover of said scanning apparatus.

* * * * *